(12) United States Patent
Nciri et al.

(10) Patent No.: US 9,983,059 B2
(45) Date of Patent: May 29, 2018

(54) DEVICE AND METHOD FOR WAVELENGTH VARIATION OF AT LEAST ONE LIGHT SOURCE FOR DERIVATIVE SPECTROSCOPY

(71) Applicant: ARCHIMEJ TECHNOLOGY, Evry (FR)

(72) Inventors: Mejdi Nciri, Paris (FR); Eric Christian Belarbre, Bergerac (FR); Henri Leung, Saint Maur des Fosses (FR)

(73) Assignee: ARCHIMEJ TECHNOLOGY, Evry (FR)

( * ) Notice: Subject to any disclaimer, the term of this patent is extended or adjusted under 35 U.S.C. 154(b) by 0 days. days.

(21) Appl. No.: 15/502,430

(22) PCT Filed: Jul. 13, 2015

(86) PCT No.: PCT/EP2015/065937
§ 371 (c)(1),
(2) Date: Feb. 7, 2017

(87) PCT Pub. No.: WO2016/020145
PCT Pub. Date: Feb. 11, 2016

(65) Prior Publication Data
US 2017/0234732 A1    Aug. 17, 2017

(30) Foreign Application Priority Data

Aug. 8, 2014  (FR) ...................................... 14 57699

(51) Int. Cl.
*G01J 3/28* (2006.01)
*G01J 3/447* (2006.01)
(Continued)

(52) U.S. Cl.
CPC ................ *G01J 3/447* (2013.01); *G01J 3/10* (2013.01); *G01J 3/4338* (2013.01); *G01J 2003/102* (2013.01)

(58) Field of Classification Search
CPC ...... G01J 3/447; G01J 3/10; G01J 3/42; G01J 3/4338; G01J 2003/102; G01J 2003/4334; G01N 21/27; G06G 7/24
(Continued)

(56) References Cited

U.S. PATENT DOCUMENTS 4,785,170 A * 11/1988 Witt .......................... G01J 1/16
250/226
2014/0197756 A1   7/2014 Sun et al.

FOREIGN PATENT DOCUMENTS

| DE | 37 06 056 A1 | 5/1988 |
| EP | 0 670 143 A1 | 9/1995 |
| WO | 2012/006617 A2 | 1/2012 |

OTHER PUBLICATIONS

International Search Report, dated Oct. 6, 2015, from corresponding PCT application.

* cited by examiner

*Primary Examiner* — Tarifur Chowdhury
*Assistant Examiner* — Jonathon Cook
(74) *Attorney, Agent, or Firm* — Young & Thompson

(57) ABSTRACT

Disclosed is a spectroscopy device, including an analysis zone for receiving a sample; at least one light-emitting diode arranged to emit a light beam towards the analysis zone, having a luminous intensity spectral profile in a working wavelength interval; unit for varying with time the luminous intensity spectral profile emitted by the diode in the working wavelength interval of the diode; a detector, arranged to receive, during a variation with time of the luminous intensity spectral profile emitted by the diode, the light beam (Continued)

Figure 1:
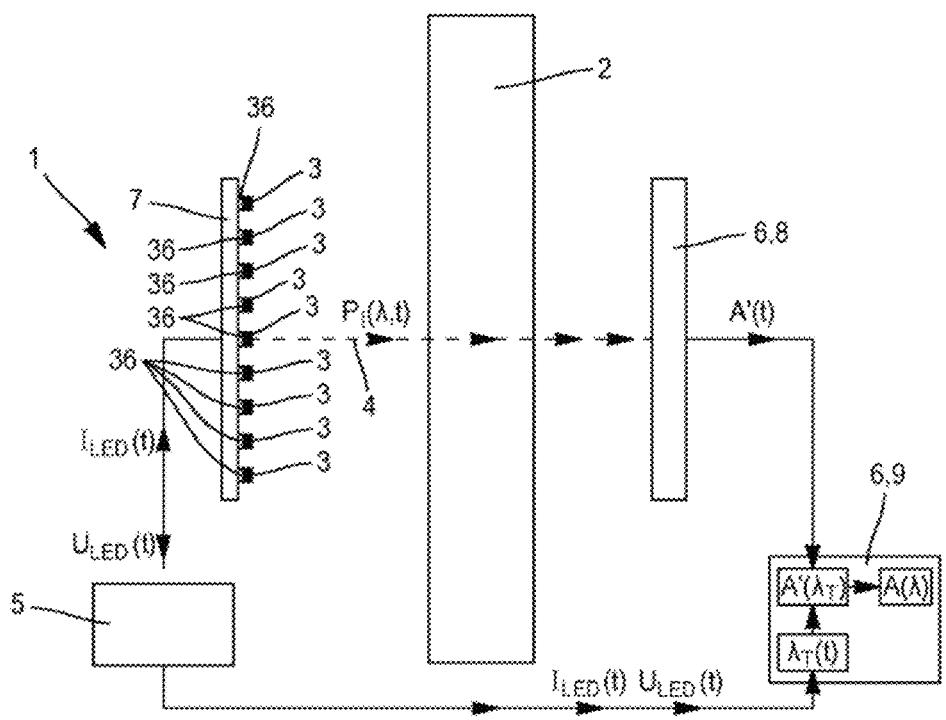

emitted by the diode and having crossed the analysis zone, and supplying a detection signal of the light beam emitted by the diode and received by the detector, in the form of a signal which depends on at least one characteristic representative of the luminous intensity spectral profile of the light-emitting diode. Application to derivative spectroscopy.

20 Claims, 4 Drawing Sheets

(51) Int. Cl.
  *G01J 3/10*  (2006.01)
  *G01J 3/433*  (2006.01)
(58) Field of Classification Search
  USPC .......................................................... 356/326
  See application file for complete search history.

DEVICE AND METHOD FOR WAVELENGTH VARIATION OF AT LEAST ONE LIGHT SOURCE FOR DERIVATIVE SPECTROSCOPY

TECHNICAL FIELD

The present invention relates to a device for wavelength variation of at least one light source. It also relates to a method for wavelength variation of at least one light source.

Such a device can for example allow a user to analyze a sample. The field of the invention is for example that of derivative spectroscopy.

STATE OF THE PRIOR ART

The technique of derivative spectroscopy, which allows the content of a sample to be studied, is known.

The general principle is for example disclosed in the document entitled "Uses of Derivative Spectroscopy" by Anthony J. Owen (Application Note, Agilent Technologies, 1995, Publication Number 5963-3940E).

The derivative of the absorption of light by a sample as a function of the wavelength can contain information that is even more useful than the adsorption itself for studying a sample.

In order to have access to a derivative value $$\frac{\Delta A}{\Delta \lambda}$$

of the absorption A as a function of the wavelength $\lambda$, if is necessary to emit light in several near wavelengths $\lambda_1$ and $\lambda_2$ (for example with $\Delta\lambda = \lambda_2 - \lambda_1$).

A first technique is to have several different light sources, each source emitting at a respective wavelength $\lambda_1$ or $\lambda_2$.

A second technique is to have a single source, the wavelength of which will be modulated within a narrow wavelength range by an electromechanical device. For example, document U.S. Pat. No. 4,752,129 describes a device in which the wavelength of a light beam emitted by a plasma source is modulated by an oscillating mirror mounted on an electromagnet, this oscillating mirror being arranged in order to reflect the light beam onto a diffraction grating.

However, such a device according to the state of the art poses several problems; due to all of these electromechanical parts (oscillating mirrors, electromagnet, diffraction grating etc.):

- this device is bulky and difficulty to miniaturize,
- this device is expensive to manufacture,
- this device is fragile and cannot withstand impacts and can only be used with difficulty in peripatetic fashion over a highly demanding terrain (wide diurnal temperature ranges, rough terrain with significant risk of falling or being shaken during its transport, etc.)

The purpose of the present invention is to resolve at least one of the problems listed above.

DISCLOSURE OF THE INVENTION

This objective is achieved with a spectroscopy device, comprising:
- an analysis zone, intended to receive a sample,
- at least one light-emitting diode, arranged in order to emit towards the analysis zone a light beam having a spectral profile of light intensity within a wavelength working range, characterized in that it also comprises, for each light-emitting diode:
- means for time variation of the spectral profile of light intensity emitted by this diode within the wavelength working range of this diode
- a detector, arranged in order to:
    - receive, during a variation over time of the spectral profile of light intensity emitted by this diode, the light beam emitted by this diode and having passed through the analysis zone,
    - supply a detection signal of the light beam emitted by this diode and received by the detector, in the form of a signal which depends on at least one characteristic representative of the spectral profile of light intensity of this light-emitting diode.

The at least one characteristic representative of the spectral profile of light intensity of a light-emitting diode can be:
- a working wavelength within the wavelength working range of this diode, this working wavelength preferably being an average wavelength of the spectral profile of light intensity of this diode within the wavelength working range of this diode, or
- a value of an electric current (supply) flowing in this diode, and/or a polarization voltage value at the terminals of this diode.

The device according to the invention can comprise, for each light-emitting diode, means for determining, on the basis of the detection signal of this diode, a data item representative of a variation in an absorption of the light beam of this diode in the analysis zone as a function of a variation in a working wavelength within the wavelength working range of this light-emitting diode. The device according to the invention can comprise means for analyzing a content of a sample in the analysis zone as a function of the determined data.

The device according to the invention can comprise, for each light-emitting diode, means for supplying this light-emitting diode with electric current by imposing an electric supply current. The device according to the invention can also comprise, for each light-emitting diode:
- means for measuring a polarization voltage of this diode, and
- means for determining, on the basis of the electric supply current imposed to this light-emitting diode and the measured polarization voltage of this diode, the at least one characteristic representative of the spectral profile of light intensity of this light-emitting diode.

The device according to the invention can comprise two separate current sources for supplying the diodes, and switches for selecting the only two diodes, among all the diodes, supplied by the current sources, these two diodes not being supplied by the same current source.

The means for varying the spectral profile of light intensity of a light-emitting diode can comprise means for adjusting the electric supply current of this light-emitting diode imposed to this diode. The means for adjusting the electric supply current of a light-emitting diode are preferably arranged:
- to adjust a time average of the electric supply current of this light-emitting diode, and/or
- in the case where the electric supply current of this light-emitting diode comprises a succession of pulses (preferably square-wave):
    - not adjust the successive pulses (preferably no adjustment of a value in the high state and/or in the low state of the successive square-wave pulses) of the electric supply current of this light-emitting diode, and/or to adjust a time density of the successive pulses of the electric supply current of this light-emitting diode.

Each light-emitting diode can be fastened to a support by a layer of adhesive:
having a thermal conductivity comprised between 0.1 and 50 W/m/K (preferably between 0.1 and 10 W/m/K), and/or
having an electrical conductivity greater than $10^6$ S/m, and/or
having a thickness comprised between 20 and 200 μm.

The means for varying the spectral profile of light intensity of a light-emitting diode can comprise means for adjusting a temperature of this light-emitting diode imposed to this diode.

The device according to the invention can also comprise, for each light-emitting diode:
a first polarizing filter between this light-emitting diode and the analysis zone, and/or
a second polarizing filter between the analysis zone and the detector.

According to yet another aspect of the invention, a spectroscopy method is proposed, comprising:
an emission, by at least one light-emitting diode, towards an analysis zone comprising a sample, of a light beam having a spectral profile of light intensity within a wavelength working range,
characterized in that it also comprises, for each light-emitting diode:
time variation of the spectral profile of light intensity emitted by this diode within the wavelength working range of this diode
receiving, by a detector and during the variation over time of the spectral profile of light intensity emitted by this diode, the light beam emitted by this diode and having passed through the analysis zone,
supplying, by this detector, a detection signal of the light beam emitted by this diode and received by the detector, in the form of a signal which depends on at least one characteristic representative of the spectral profile of light intensity of this light-emitting diode.

The at least one characteristic representative of the spectral profile of light intensity of a light-emitting diode can be:
a working wavelength within the wavelength working range of this diode, this working wavelength preferably being an average wavelength of the spectral profile of light intensity of this diode within the wavelength working range of this diode, or
a value of an electric (supply) current flowing in this diode, and/or a polarization voltage value at the terminals of this diode.

The method according to the invention can comprise, for each light-emitting diode, determining, on the basis of the detection signal of this diode, a data item representative of a variation in an absorption of the light beam of this diode in the analysis zone as a function of a variation in a working wavelength within the wavelength working range of this light-emitting diode. The method according to the invention can comprise an analysis of a content of a sample in the analysis zone as a function of the determined data.

The method according to the invention can comprise, for each light-emitting diode, supplying this light-emitting diode with electric current by imposing an electric supply current. The method according to the invention can also comprise, for each light-emitting diode:
measuring a polarization voltage of this diode, and
determining, on the basis of the electric supply current imposed to this light-emitting diode and the measured polarization voltage of this diode, the at least one characteristic representative of the spectral profile of light intensity of this light-emitting diode.

The electric current supply can be produced by two separate current sources, and switches for selecting the only two diodes, from all the diodes, supplied by the current sources, these two diodes not being supplied by the same current source.

Variation of the spectral profile of light intensity of a light-emitting diode can comprise adjusting the electric supply current of this light-emitting diode imposed to this diode. Adjusting the electric supply current of a light-emitting diode can comprise adjusting a time average of the electric supply current of this light-emitting diode.

The electric supply current of this light-emitting diode can comprise a succession of pulses (preferably square-wave). Adjusting the electric supply current of a light-emitting diode can:
not comprise an adjustment of the successive pulses (preferably no adjustment of a value in the high state and/or in the low state of the successive square-wave pulses) of the electric supply current of this light-emitting diode, and/or
comprise an adjustment of a time density of the successive pulses of the electric supply current of this light-emitting diode.

Variation of the spectral profile of light intensity of a light-emitting diode can comprise adjusting a temperature of this light-emitting diode imposed to this diode.

DESCRIPTION OF THE FIGURES AND EMBODIMENTS

Figure 2:
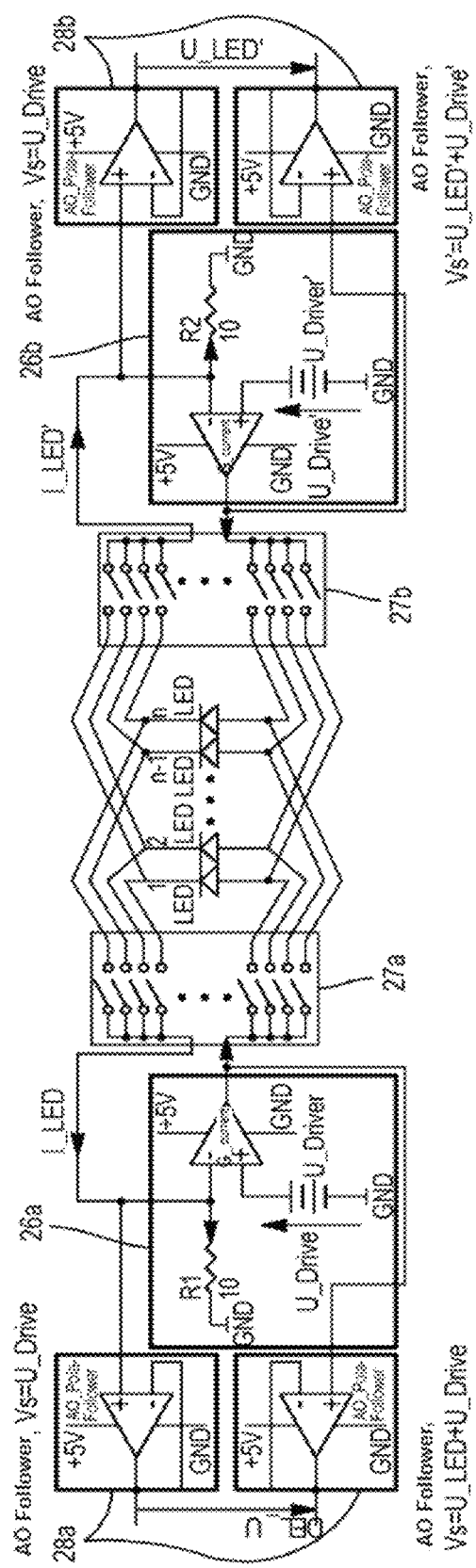
Figure 3:
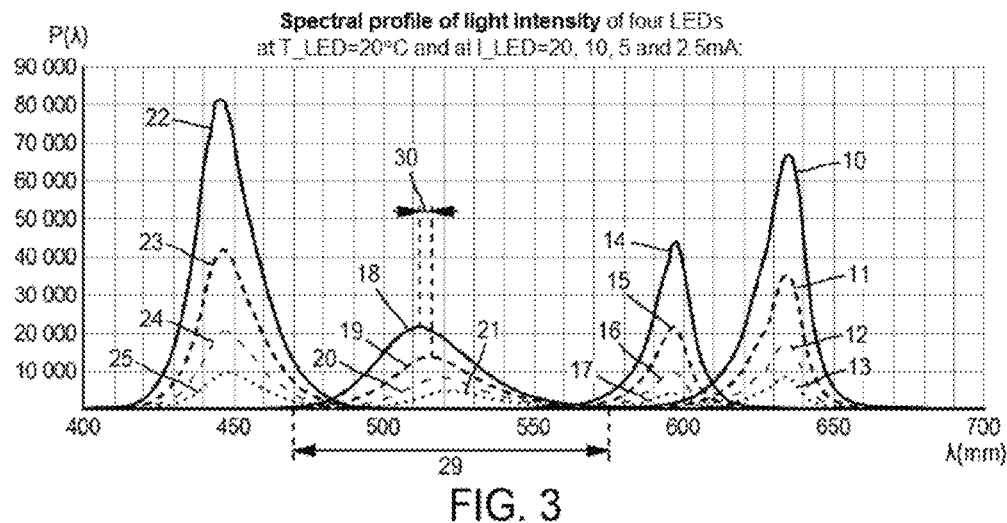
Figure 4:
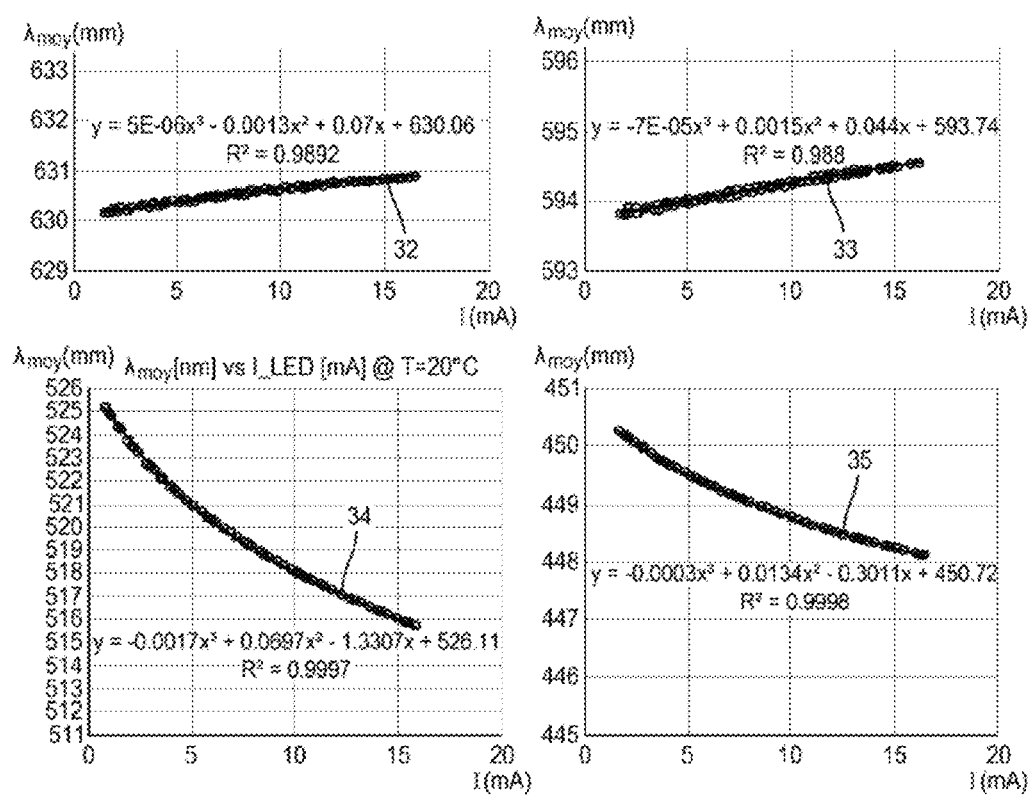
Figure 5:
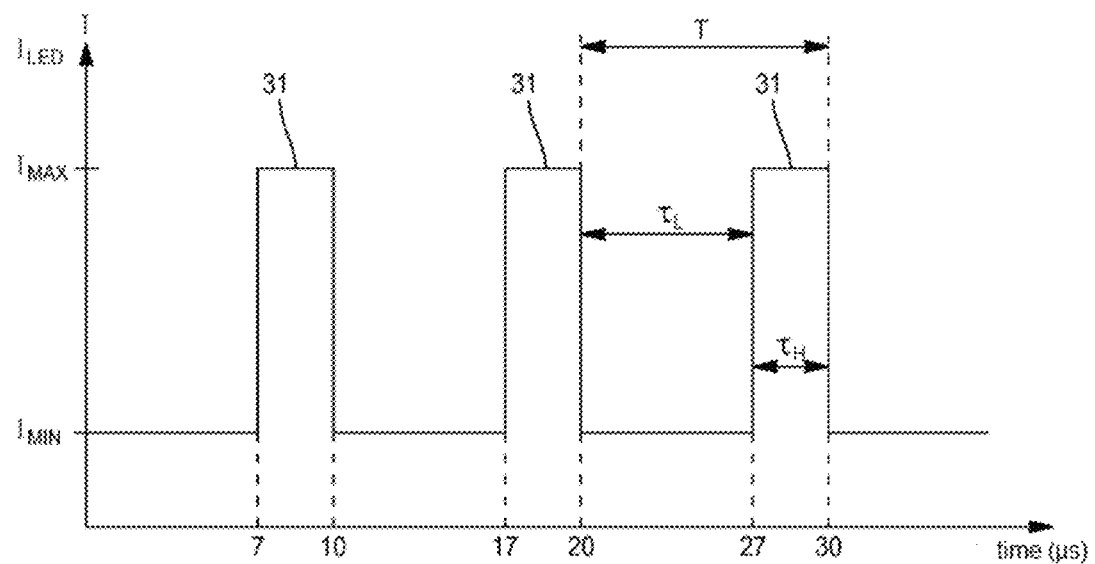

Other advantages and characteristics of the invention will become apparent on examination of the detailed description of implementations and embodiments which are in no way limitative, and the attached drawings:

FIG. 1 is a diagrammatic view of a first embodiment of a device 1 according to the invention, which is the preferred embodiment of the invention, FIG. 2 is a diagram of the control electronics of the light-emitting diodes 3 of device 1, FIG. 3 shows, for four separate light-emitting diodes 3 of the device 1, the spectral profile of light intensity of each diode within a wavelength working range for four different electric supply currents, FIG. 4 shows, for each of these four diodes 3, the variation in the average emission wavelength of their spectral profile of light intensity as a function of the electric supply current, and FIG. 5 shows the shape of the electric supply current of a diode 3 in the device 1.

As these embodiments are in no way limitative, variants of the invention can be considered comprising only a selection of the characteristics described or shown hereinafter, in isolation from the other characteristics described or shown (even if this selection is isolated within a phrase containing other characteristics), if this selection of characteristics is sufficient to confer a technical advantage or to differentiate the invention with respect to the state of the art. This selection comprises at least one, preferably functional, characteristic without structural details, and/or with only a part of the structural details if this part alone is sufficient to confer a technical advantage or to differentiate the invention with respect to the state of the prior art.

Firstly, a first embodiment of the device 1 according to the invention will be described, with reference to FIGS. 1 to 5.

With reference to FIG. 1, the spectroscopy device 1 comprises an analysis zone 2, intended to receive a sample. This sample can for example be:
- a liquid (blood, water, etc.) in a transparent tank, and/or
- a solid in a transparent tank or placed (for example in section) on a transparent slide, and/or
- a gas enclosed in a transparent tank or open (for example ambient air).

The device 1 comprises, as a light source, at least one (preferably several "n" (typically n=9) diodes 3 in FIGS. 1 and 2) light-emitting diodes 3 (or "LEDs"), arranged in order to emit towards the analysis zone 2 a light beam 4 having a spectral profile of light intensity within a wavelength working range.

The wavelength working ranges of the different diodes 3 are different (and ideally do not overlap one another).

The diodes 3 are typically diodes of the LED chip type, mounted on a support 7 (also called lead frame) similar to the model PLCC-6 5050 used in lighting for accommodating three RGB chips.

By "spectral profile of light intensity within a wavelength working range" $P(\lambda)$ of a diode is meant the different light intensity values emitted by this diode as a function of the wavelength $\lambda$ within the wavelength working range of this diode 3, optionally standardized.

The "spectral profile of light intensity within a wavelength working range" of a diode is preferably the relationship between:
- the different light intensity values emitted by this diode as a function of the wavelength within the wavelength working range of this diode 3, and
- the total intensity emitted by this diode reference is then made to "standardized spectral profile" or "standardized emission spectrum".

The light intensity at a given wavelength (typically integrated within a unit of wavelength) of a source (diode 3) is preferably a number of photons emitted by the source per unit of time (for example per second) at this given wavelength (typically in photons per second per nanometer).

The device 1 also comprises, for each diode 3, means 5 for time variation (simultaneously or independently of the other diodes 3) of the spectral profile of light intensity emitted by this diode 3 within the wavelength working range of this diode 3. This variation in the spectral profile of light intensity typically comprises:
- A "translation", typically a variation in the average wavelength $\lambda_{moy}$, and/or
- A variation in the total light intensity over the sum of all of the wavelengths in the wavelength working range.

These means 5 comprise an electronic board (the support 7 typically being mounted (soldered) onto and flush against this electronic board) shown in greater detail in FIG. 2.

The device 1 also comprises, for each diode 3, a detector 6.

The detector 6 comprises for example a receiver 8 of the flat silicon photodiode type and blue-enhanced, for example reference BPW34-B manufactured by OSRAM.

The detector 6 also comprises processing means 9 which comprise at least one computer, and/or a central processing or calculation unit, and/or an analogue electronic circuit (preferably dedicated) and/or a digital electronic circuit (preferably dedicated) and/or a microprocessor (preferably dedicated), and/or software means.

The detector 6 (more specifically the receiver 8) is arranged in order to receive, during a variation over time of the spectral profile of light intensity emitted by one of the diodes 3, the light beam 4 emitted by this diode 3 having passed through the analysis zone 2, and the detector 6 (more specifically the processing means 9) is arranged in order to supply (on the basis of this reception) a detection signal A' of the light beam 4 emitted by this diode 3 and received by the detector 6 (this signal A' depending on the spectral profile of light intensity of this diode 3 and the spectral adsorption of the sample in zone 2); the detector 6 (more specifically the processing means 9) is also arranged in order to store this detection signal as a signal which depends on at least one characteristic representative of the spectral profile of light intensity of this diode 3.

The at least one characteristic representative of the spectral profile of light intensity of a diode 3 is or comprises:
- a working wavelength $\lambda_T$ within the wavelength working range of this diode 3, this working wavelength being for example:
  - an average wavelength $\lambda_{moy}$ of the spectral profile of light intensity of this diode 3 weighted by the different values of the light intensity of this diode 3 within the wavelength working range of this diode 3, or
  - the wavelength of the maximum intensity of the spectral profile of light intensity of this diode 3,
- the complete spectral profile $P(\lambda)$ of light intensity of this diode 3, or
- the imposed electric supply current/the measured polarization voltage pair for this diode 3 (typically $I_{LED}$ and $U_{LED}$), described hereinafter, which unambiguously corresponds to a single spectral profile of light intensity.

Thus this detection signal A':
- is associated with the variation in the spectral profile of light intensity $P(\lambda)$ of this diode 3, preferably and/or with a variation in the working wavelength of this diode $\lambda_T$,
- i.e. it is supplied as a function of the spectral profile of light intensity of this diode, preferably as a function of the working wavelength of this diode 3;

This detection signal A' is also associated with the spectral absorption of the sample.

The way in which this detection signal A' is determined will now be described.

All the diodes 3 of the device 1 are different, but emit wavelengths that are too distant from one another to allow derivative adsorption spectroscopy to be performed.

The device 1 (more specifically the variation means 5) comprises, for each diode 3, means 26a, 26b, 27a, 27b for supplying this light-emitting diode 3 with electric current by imposing an electric supply current.

The device 1 comprises two current sources 26a and 26b and two sets of switches 27a and 27b which make it possible at a time t to supply two diodes 3 simultaneously with current.

Thus, the device 1 comprises two separate current sources 26a, 26b for supplying the diodes 3, and switches 27a, 27b for selecting the only two diodes, from all the diodes, supplied by the current sources, these two diodes not being supplied by the same current source.

When it is supplied with current, each diode 3 is supplied by an electric supply current $I_{LED}(t)$ which varies as a function of time t as shown in FIG. 5. This electric supply signal comprises a succession of electric pulses 31 (each pulse 31 being for example a square wave):
- Having a maximum current $I_{max}$ (typically 10 to 100 mA)
- Having a minimum current $I_{min}$ (typically 0 to 10 mA)
- Having an amplitude $$\frac{I_{max} - I_{min}}{2}$$

Having a period T for the pulses 31 (for example 10 μs)
Having a duration $\tau_H$ for each pulse 31 (for example 3 μs)
Having a gap $\tau_L = T - \tau_H$ between the pulses 31 (for example 7 μs)
Having a duty cycle $$R_c = \frac{\tau_H}{T}$$

(for example 30%)
Having an average current, during T, equal to $$I_{moy} = \frac{\tau_L I_{min} + \tau_H I_{max}}{T}$$

FIG. 3 shows, for four separate diodes 3 of the device 1, the spectral profile of light intensity of each of these four diodes within their wavelength working range for four different electric supply currents. All the electric supply currents correspond to the values given above (duty cycle set at 30%, $I_{min}$=0 mA, T=10 μs, $\tau_H$=3 μs, square-wave pulses 31), only $I_{max}$ is altered.

In FIG. 3, the curves 10, 11, 12, 13 show the spectral profile of light intensity of a first diode 3 of the LED chip type of AlGaInP structure, generally used for lighting applications and outdoor red display, for a temperature of this diode at $T_{LED}$=20° C. and for different $I_{LED}$ of this diode (for different $I_{max}$ values):
  The curve 10 shows the spectral profile of light intensity of this first diode 3 for an $I_{max}$ value of $I_{LED}$ equal to $I_{max}$=20 mA
  The curve 11 shows the spectral profile of light intensity of this first diode 3 for an $I_{max}$ value of $I_{LED}$ equal to $I_{max}$=10 mA
  The curve 12 shows the spectral profile of light intensity of this first diode 3 for an $I_{max}$ value of $I_{LED}$ equal to $I_{max}$=5 mA
  The curve 13 shows the spectral profile of light intensity of this first diode 3 for an $I_{max}$ value of $I_{LED}$ equal to $I_{max}$=2.5 mA In FIG. 4, the curve 32 shows the average wavelength $\lambda_{moy}$ of the light beam 4 emitted by this first diode (later equivalent to the working wavelength $\lambda_T$) as a function of $I_{max}$ and under the same conditions (duty cycle set at 30%, Imin=0 mA, T=10 μs, $\tau_H$=3 μs) and defined by the following formula:
  $\lambda_{moy} = \lambda P(\lambda) d\lambda$ if $P(\lambda)$ is a standardized spectral profile of this diode in question, or $$\lambda_{moy} = \frac{\int \lambda P(\lambda) d\lambda}{\int P(\lambda) d\lambda}$$

if $P(\lambda)$ is a non-standardized spectral profile,
each of these integrals being realized over the wavelength working range of the considered diode 3.

In FIG. 3, the curves 14, 15, 16, 17 show the spectral profile of light intensity of a second diode 3 of the LED chip type of AlGaInP structure, (in proportions different to the preceding LED) generally used for lighting applications and outdoor orange colour display, for a temperature of this diode at $T_{LED}$=20° C. and for different $I_{LED}$ of this diode (for different $I_{max}$ values):
  The curve 14 shows the spectral profile of light intensity of this second diode 3 for an $I_{max}$ value of $I_{LED}$ equal to $I_{max}$=20 mA
  The curve 15 shows the spectral profile of light intensity of this second diode 3 for an $I_{max}$ value of $I_{LED}$ equal to $I_{max}$=10 mA
  The curve 16 shows the spectral profile of light intensity of this second diode 3 for an $I_{max}$ value of $I_{LED}$ equal to $I_{max}$=5 mA
  The curve 17 shows the spectral profile of light intensity of this second diode 3 for an $I_{max}$ value of $I_{LED}$ equal to $I_{max}$=2.5 mA.

In FIG. 4, the curve 33 shows the average wavelength $\lambda_{moy}$ of the light beam emitted by this second diode (later equivalent to the working wavelength $\lambda_T$) as a function of $I_{max}$ and under the same conditions (duty cycle set at 30%, Imin=0 mA, T=10 μs, $\tau_H$=3 μs) and defined by the same formula as previously.

In FIG. 3, the curves 18, 19, 20, 21 show the spectral profile of light intensity of a third diode 3 of the LED chip type of InGaN structure, generally used for the colour green in RGB lighting systems, for a temperature of this diode at $T_{LED}$=20° C. and for different $I_{LED}$ of this diode (for different $I_{max}$ values):
  The curve 18 shows the spectral profile of light intensity of this third diode 3 for a $I_{max}$ value of $I_{LED}$ equal to $I_{max}$=20 mA
  The curve 19 shows the spectral profile of light intensity of this third diode 3 for an $I_{max}$ value of $I_{LED}$ equal to $I_{max}$=10 mA
  The curve 20 shows the spectral profile of light intensity of this third diode 3 for an $I_{max}$ value of $I_{LED}$ equal to $I_{max}$=5 mA
  The curve 21 shows the spectral profile of light intensity of this third diode 3 for an $I_{max}$ value of $I_{LED}$ equal to $I_{max}$=2.5 mA In FIG. 4, the curve 34 shows the average wavelength $\lambda_{moy}$ of the light beam emitted by this third diode (later equivalent to the working wavelength $\lambda_T$) as a function of $I_{max}$ and under the same conditions (duty cycle set at 30%, Imin=0 mA, T=10 μs, $\tau_H$=3 μs) and defined by the same formula as previously.

For this third diode, its wavelength working range is for example referenced 29, giving:
  (curve 18) $\lambda_{moy}$=513.8 nm for an $I_{max}$ value of $I_{LED}$ equal to $I_{max}$=20 mA
  (curve 19) $\lambda_{moy}$=518.1 nm for an $I_{max}$ value of $I_{LED}$ equal to $I_{max}$=10 mA
  (curve 20) $\lambda_{moy}$=521.0 nm for an $I_{max}$ value of $I_{LED}$ equal to $I_{max}$=5 mA
  (curve 21) $\lambda_{moy}$=523.2 nm for an $I_{max}$ value of $I_{LED}$ equal to $I_{max}$=2.5 mA In FIG. 3, the curves 22, 23, 24, 25 show the spectral profile of light intensity of a fourth diode 3 of the LED chip type of InGaN structure, (in proportions different to the preceding LED) generally used for backlighting applications for television or lighting for a temperature of this diode at $T_{LED}$=20° C. and for different $I_{LED}$ of this diode (for different $I_{max}$ values):
  The curve 22 shows the spectral profile of light intensity of this fourth diode 3 for an $I_{max}$ value of $I_{LED}$ equal to $I_{max}$=20 mA
  The curve 23 shows the spectral profile of light intensity of this fourth diode 3 for an $I_{max}$ value of $I_{LED}$ equal to $I_{max}$=10 mA The curve 24 shows the spectral profile of light intensity of this fourth diode 3 for n $I_{max}$ value of $I_{LED}$ equal to $I_{max}$=5 mA The curve 25 shows the spectral profile of light intensity of this fourth diode 3 for an $I_{max}$ value of $I_{LED}$ equal to $I_{max}$=2.5 mA In FIG. 4, the curve 35 shows the average wavelength $\lambda_{moy}$ of the light beam emitted by this fourth diode (later equivalent to the working wavelength $\lambda_T$) as a function of $I_{max}$ and under the same conditions (duty cycle set at 30%, Imin=0 mA, T=10 µs, $\tau_H$=3 µs) and defined by the same formula as previously.

According to this embodiment according to the invention, for each diode 3 the variation of $\lambda_{moy}$ or $\lambda_T$ is less than the full width at half maximum (FWHM) of the spectral profile of this diode 3.

Generally, the methods for the manufacture of quasi-monochrome LEDs limit the variation of $\lambda_T$ over the same spectrum range as the spectral width of emission.

It is noted that the spectral profile of light intensity or $\lambda_{moy}$ of a diode 3 is determined by two parameters:

By its electric supply current: $I_{LED}$, and

Either:

By the temperature $T_{LED}$ of the diode 3, which depends in particular:
  on the temperature of the lead frame 7 and the ambient temperature,
  on the time profile of $I_{LED}$ (typically of t T or $R_C$, cf. FIG. 5), which can cause heating of the diode By the polarization voltage at the terminals of this diode 3: $U_{LED}$, which is representative of the temperature of this diode.

For a better temperature stabilization $T_{LED}$ of the diode 3, each diode 3 is fastened onto its support 7 (also called lead frame), this support 7 preferably being common for all the diodes 3) by a layer of adhesive 36 having (at a temperature of the adhesive of 20° C. and in ambient air) a thermal conductivity comprised between 0.1 and 50 W/m/K, preferably comprised between 0.1 and 10 W/m/K.

This adhesive has (at a temperature of the adhesive of 20° C. and in ambient air) an electrical conductivity greater than $10^6$ S/m.

Conventionally, a solder paste made from an alloy of tin, copper and silver is used to fasten the diodes 3. It has a low thermal conductivity (less than 40 W/m/K). For greater flexibility it is possible to use conductive adhesives such as epoxy mixed with particles of silver. They are more malleable and easier to use and have a quite low thermal conductivity (typically 1 to 30 W/m/K).

(Conversely in a variant, a sintered adhesive is used in which a silver-based powder is pressed in order to form a thermal paste with a very high thermal conductivity (greater than 100 W/m/K) which makes it possible to rapidly scan wide temperature ranges.

This adhesive has (at a temperature of the adhesive of 20° C. and in ambient air) a thickness comprised between 20 and 200 µm.

The processing means 9 have stored data (for example in the form of one or more look-up tables) making it possible to know, for each diode 3, what is:
  its spectral profile of light intensity
  its working wavelength $\lambda_T$, or
  more generally, the at least one characteristic representative of the spectral profile of light intensity of this diode 3, as a function of its electric supply current $I_{LED}$ (typically $I_{max}$ and/or optionally T and/or $R_C$) and of its polarization voltage ($U_{LED}$). These data are for example obtained and stored according to the manufacturer's instructions for each diode 3 or according to the calibrations carried out on each diode 3 for different $I_{LED}$ and $U_{LED}$.

The means 5 for varying the spectral profile of light intensity of a light-emitting diode 3 comprise supply means 26a, 26b, 27a, 27b and control means (not shown, typically comprising buttons for the adjustment of the supplies 26a et 26b), the whole being arranged for adjusting the electric supply current of this diode 3 imposed to this diode 3.

These means for adjusting the electric supply current of a diode 3 are arranged in order to adjust a time average of the electric supply current of this diode 3.

To this end, these means for adjusting the electric supply current of a diode 3 are arranged for a "normal" adjustment by adjusting $I_{max}$.

These means for adjusting the electric supply current of a diode 3 are arranged for a "precise" adjustment comprising:
  preferably no adjustment of the successive pulses 31 of this diode 3, in particular its shape (square-wave), the $I_{max}$ values, the duration $\tau_H$ (although in a variant, $I_{max}$ can vary over time)
  an alteration over time of the time density of the successive pulses 31 (for example of the duty cycle $R_C$) of the electric supply current of this diode 3, which can cause heating of this diode 3.

The device 1 also comprises, (on the same electronic board as the variation means 5) for each diode 3:
  means 28a or 28b for measuring a polarization voltage of this diode 3, comprising for example two mounted voltage follower operational amplifiers connected to a differential analogue-to-digital converter, and
  means (typically processing means 9) for determining, on the basis of the electric supply current imposed to this light-emitting diode 3 at a time t and from the measured polarization voltage of this diode at the same time t, the at least one characteristic representative of the spectral profile of light intensity of this diode 3, for example:
    the (complete) spectral profile of light intensity emitted by this diode in the wavelength working range of this diode, using the data (for example in the form of a look-up table) making it possible to know, for each diode 3, what is its spectral profile of light intensity as a function of its electric supply current $I_{LED}$ (typically $I_{max}$ and optionally $R_C$) and its polarization voltage ($U_{LED}$), and/or
    the working wavelength of this diode 3, by exploiting the data (for example in the form of a look-up table) making it possible to know, for each diode 3, what is its working wavelength $\lambda_T$ as a function of its electric supply current $I_{LED}$ (typically $I_{max}$ and optionally $R_C$) and its polarization voltage ($U_{LED}$).

For different times t, and for each diode 3 emitting light passing through the analysis zone 2 and received by the receiver 8, the processing means 9:
  receive, from the means 5, the values of the electric supply current imposed to this diode 3 as a function of t $I_{LED}(t)$ (typically $I_{max}(t)$ and optionally $R_C(t)$) and of the polarization voltage measured at the terminals of this diode 3 as a function of t (typically $U_{LED}(t)$), and optionally determine
    the spectral profile of light intensity P(λ, t) of this diode varying as a function of t and/or
    the working wavelength $\lambda_T(t)$ varying as a function of t, and/or
    more generally, the at least one characteristic representative of the spectral profile of light intensity of this diode 3 varying as a function of t receive, from the receiver 8, a detection signal A'(t) of the light beam 4 emitted by this diode 3, having passed through the analysis zone 2 and received by the receiver 8, as a function of t, associate this detection signal (A') with the at least one characteristic representative of the spectral profile of light intensity of this diode 3 (by means of a synchronous detection) in order to supply a detection signal A' which no longer depends on time but on the spectral profile of light intensity of this diode 3. In practice, it is possible for example to associate this detection signal A'(t) with:

$\lambda_T(t)$ in order to supply a detection signal A'($\lambda_T$) which is a function of $\lambda_T$, or $I_{LED}$ and $U_{LED}$ in order to supply a detection signal A'($I_{LED}$, $U_{LED}$) which is a function of $I_{LED}$ et $U_{LED}$.

A' represents the absorption (not only by the sample) measured by the detector 6.

This signal A' is an absorption signal, since for the beam 4 of a diode 3 at the variable working wavelength:

the detector 6 detects the light intensity of this beam 4 at this working wavelength after passing through the analysis zone 2, and the processing means 9 are capable of associating this detected light intensity with a spectral profile of the beam 4 emitted by this diode 3 before passing through the analysis zone 2, i.e. with the light intensity of this beam 4 at this working wavelength before passing through the analysis zone 2.

The processing means 9 are arranged in order to calculate, on the basis of A':

an average value of the spectral absorption A of the beam 4 by the sample in the analysis zone 2, in the wavelength working range of each diode for a fixed spectral profile, the values of the derivative of the spectral absorption (typically)

$$\left(\text{typically } \frac{dA(\lambda)}{d\lambda}\right)$$

) of the sample in the analysis zone 2, this derivative of the absorption being calculated in the wavelength working range of each diode of which the spectral profile was varied; more specifically, for each diode, this derivative is calculated for a wavelength variation range dλ (reference 30 in FIG. 3) typically equal to the difference between two working wavelengths $\lambda_T$ of a diode for two different supply values $I_{max}$ of this diode.

In order to determine these values, the processing means 9 use for example the algorithmic method of Fourier transform and deconvolution.

Thus, the processing means 9 are arranged, for each diode 3, in order to determine from the detection signal of this diode (typically A'($\lambda_T$)):

An item of overall information representative of the average absorption in the working range of the diode 3

A data item (local information) representative of a variation dA($\lambda_T$) of an absorption, in the analysis zone 2, of the light beam 4 of this diode 3 as a function of a variation d$\lambda_T$ of a working wavelength within the wavelength working range of this diode 3, or more generally as a function of a variation of the spectral profile of light intensity of this diode (or more generally as a function of at least one characteristic representative of the spectral profile of light intensity of this diode 3).

Finally, the processing means 9 are arranged in order to analyze a content of the sample in the analysis zone 2 as a function of the determined data (values of the derivative of the spectral absorption) for example via methods or algorithms similar to those described in:

"A multichannel photometer based on an array of light emitting diodes for use in multivariate calibration", by Alexandre Fonseca and Ivo M. Raimundo Jr, Analytica Chimica Acta vol. 522 (2004) p. 223-229, and/or "Resolution of overlapping UV-Vis absorption bands and quantitative analysis" by Liudmil Antonov and Daniela Nedeltcheva, Chem. Soc. Rev. Vol. 29 (2000) p. 217-227, It is noted that the device 1 is:

Not very bulky and can be easily miniaturized, and can be limited to a stack of the support 7 flush with the electronic board of the means 5, of the analysis zone 2, and of the receiver 8 flush with an electronic board of the processing means 9, preferably so that the electronic boards of the means 5 and 9 are parallel, this device 1 is not very expensive to manufacture.

By its compact nature, and taking account of the absence of complex electromechanical parts, this device 1 is robust.

The judicious use of LEDs 3 for performing derivative spectroscopy thus makes it possible to improve the derivative spectroscopy.

Moreover, it is noted that the invention makes it possible to improve the conventional spectroscopy by LEDs (which is accurate, compact, low-cost, rapid and robust) making derivative spectroscopy accessible thereto.

Thus, to summarize, the spectroscopy method implemented within the device 1 comprises:

an emission, by at least one diode 3, towards an analysis zone 2 comprising a sample, of a light beam 4 having a spectral profile of light intensity within a wavelength working range, and also comprises, for each emitting diode 3:

a variation over time of the spectral profile of light intensity emitted by this diode within the wavelength working range of this diode; this diode is supplied with electric current (by the sources 26 and switches 27 as previously described) by imposing an electric supply current to it; the electric supply current of this diode 3 comprises a succession of pulses 31; the variation in the spectral profile of light intensity of this diode 3 comprises an adjustment of the electric supply current of this diode 3 imposed to this diode, which comprises:

an adjustment to a time average of the electric supply current of this light-emitting diode 3, no adjustment of the successive pulses 31 of this diode 3, an adjustment of a time density of the successive pulses of the electric supply current of this diode 3.

receiving, by the detector 6, and during the variation over time of the spectral profile of light intensity emitted by this diode, the light beam 4 emitted by this diode, having passed through the analysis zone 2, measuring a polarization voltage of this diode, and determining, on the basis of the electric supply current imposed to this diode 3 and the measured polarization voltage of this diode, the at least one characteristic representative of the spectral profile of light intensity of this light-emitting diode 3.

supplying, by this detector 6, a detection signal of the light beam emitted by this diode 3 and received by the detector 6, (this detection signal depending on the spectral profile of light intensity of this diode 3 and on the spectral adsorption of the sample), storing, by the detector 6, (by the processing means 9) of this detection signal as a signal which depends on the at least one characteristic representative of the spectral profile of light intensity of this diode 3.

determining, on the basis of the detection signal of this diode, a data item representative of a variation in an absorption, in the analysis zone 2, of the light beam 4 of this diode 3 as a function of a variation in the at least one characteristic representative of the spectral profile of light intensity of this diode 3 or as a function of a variation in the working wavelength within the working range of this diode 3, (for example if the at least one characteristic representative of the spectral profile of light intensity of this diode is different from the working wavelength within the wavelength working range of this diode).

The method also comprises an analysis of a content of a sample in the analysis zone as a function of the determined data.

In a variant of the first embodiment that has just been described, the means for varying the spectral profile of light intensity of a diode 3 also comprise means (thermostat, Peltier module) for adjusting a temperature $T_{LED}$ of this light-emitting diode 3 imposed to this diode. The device according to the invention can comprise a thermostat or Peltier module per diode 3 or per group of diodes 3 or for the whole set of diodes. The diodes are still supplied with current and their polarization voltage is still measured as previously. This variant makes it possible to vary the spectral profile of the diodes to a greater extent. Thus, variation of the spectral profile of light intensity of a diode 3 comprises adjusting a temperature of this diode 3 imposed to this diode.

In a variant of the first embodiment that has just been described, which can optionally be combined with the preceding variants, the device 1 also comprises, for each diode 3:

a first polarizing filter (preferably common to all the diodes) between the at least one diode 3 and the analysis zone 2, and a second polarizing filter (preferably common to all the diodes) between the analysis zone 2 and the detector 6 (more specifically the receiver 5).

This makes it possible to perform circular dichroism spectroscopy (CDS).

In a variant of the first embodiment that has just been described, which can optionally be combined with the preceding variants, the device 1 comprises a system of spatial multiplexing of the light emitted by the LEDs 3 into a single collimated beam, for example as described in patent application WO 2013 167 824.

In a variant of the first embodiment that has just been described, which can optionally be combined with the preceding variants, the device 1 comprises means for measuring the temperature of each diode 3. The temperature of each diode 3 is measured instead of measuring its polarization voltage. However, this variant is slower and less accurate.

Of course, the invention is not limited to the examples which have just been described and numerous adjustments can be made to these examples without exceeding the scope of the invention.

Of course, the various characteristics, forms, variants and embodiments of the invention can be combined together in various combinations provided that they are not incompatible or mutually exclusive. In particular, all the previously described variants and embodiments can be combined together.

The invention claimed is:

1. Spectroscopy device, comprising:
an analysis zone (2), intended to receive a sample,
at least one light-emitting diode (3), arranged in order to emit towards the analysis zone (2) a light beam (4) having a spectral profile of light intensity within a wavelength working range,
said device comprising, for each light-emitting diode (3):
means (5) for time variation of the spectral profile of light intensity emitted by this diode (3) within the wavelength working range of this diode,
a detector (6, 8, 9), arranged in order to:
receive, during a variation over time of the spectral profile of light intensity emitted by this diode (3), the light beam (4) emitted by this diode (3) and having passed through the analysis zone (2),
supply a detection signal (A') of the light beam emitted by this diode (3) and received by the detector, in the form of a signal which depends on at least one characteristic representative of the spectral profile of light intensity of this light-emitting diode;
further comprising, for each light-emitting diode (3):
means (26a, 26b, 27a, 27b) for supplying this light-emitting diode (3) with electric current by imposing an electric supply current
means (28a, 28b) for measuring a polarization voltage of this diode, and
means (9) for determining, on the basis of the electric supply current imposed to this light-emitting diode and the measured polarization voltage of this diode, the at least one characteristic representative of the spectral profile of light intensity of this light-emitting diode.

2. Device according to claim 1, wherein the at least one characteristic representative of the spectral profile of light intensity of a light-emitting diode (3) is a working wavelength ($\lambda_T$) within the wavelength working range of this diode (3), this working wavelength preferably being an average wavelength of the spectral profile of light intensity of this diode within the wavelength working range of this diode.

3. Device according to claim 2, further comprising, for each light-emitting diode (3), means (9) for determining, on the basis of the detection signal of this diode, a data item representative of a variation in an absorption of the light beam (4) of this diode (3) in the analysis zone (2) as a function of a variation in a working wavelength within the wavelength working range of this light-emitting diode.

4. Device according to claim 2, further comprising two separate current sources (26a, 26b) for supplying the diodes (3), and switches (27a, 27b) for selecting the only two diodes (3), from all the diodes (3), supplied by the current sources, these two diodes not being supplied by the same current source.

5. Device according to claim 2, wherein the means (5) for varying the spectral profile of light intensity of a light-emitting diode comprise means for adjusting the electric supply current imposed to this diode (3).

6. Device according to claim 1, further comprising, for each light-emitting diode (3), means (9) for determining, on the basis of the detection signal of this diode, a data item representative of a variation in an absorption of the light beam (4) of this diode (3) in the analysis zone (2) as a function of a variation in a working wavelength within the wavelength working range of this light-emitting diode.

7. Device according to claim 6, further comprising means (9) for analyzing a content of a sample in the analysis zone as a function of the determined data.

8. Device according to claim 7, further comprising two separate current sources (26a, 26b) for supplying the diodes (3), and switches (27a, 27b) for selecting the only two diodes (3), from all the diodes (3), supplied by the current sources, these two diodes not being supplied by the same current source.

9. Device according to claim 7, wherein the means (5) for varying the spectral profile of light intensity of a light-emitting diode comprise means for adjusting the electric supply current imposed to this diode (3).

10. Device according to claim 6, further comprising two separate current sources (26a, 26b) for supplying the diodes (3), and switches (27a, 27b) for selecting the only two diodes (3), from all the diodes (3), supplied by the current sources, these two diodes not being supplied by the same current source.

11. Device according to claim 6, wherein the means (5) for varying the spectral profile of light intensity of a light-emitting diode comprise means for adjusting the electric supply current imposed to this diode (3).

12. Device according to claim 1, further comprising two separate current sources (26a, 26b) for supplying the diodes (3), and switches (27a, 27b) for selecting the only two diodes (3), from all the diodes (3), supplied by the current sources, these two diodes not being supplied by the same current source.

13. Device according to claim 12, wherein the means (5) for varying the spectral profile of light intensity of a light-emitting diode comprise means for adjusting the electric supply current imposed to this diode (3).

14. Device according to claim 1, wherein the means (5) for varying the spectral profile of light intensity of a light-emitting diode comprise means for adjusting the electric supply current imposed to this diode (3).

15. Device according to claim 14, wherein the means (5) for adjusting the electric supply current of a light-emitting diode (3) are arranged in order to adjust a time average of the electric supply current of this light-emitting diode (3).

16. Device according to claim 15, wherein the means (5) for adjusting the electric supply current of a light-emitting diode (3) are arranged:
so that the electric supply current of this light-emitting diode (3) comprises a succession of pulses (31),
to not adjust the successive pulses (31) of the electric supply current of this light-emitting diode (3),
to adjust a time density of the successive pulses (31) of the electric supply current of this light-emitting diode.

17. Device according to claim 1, wherein each light-emitting diode (3) is fastened on a support (7) by a layer of adhesive (36) having a thermal conductivity comprised between 0.1 and 10 W/m/K.

18. Device according to claim 1, wherein the means (5) for varying the spectral profile of light intensity of a light-emitting diode (3) comprise means for adjusting a temperature of this light-emitting diode imposed to this diode.

19. Device according to claim 1, further comprising, for each light-emitting diode:
a first polarizing filter between this light-emitting diode and the analysis zone, and
a second polarizing filter between the analysis zone and the detector.

20. Spectroscopy method, comprising:
an emission, by at least one light-emitting diode (3), towards an analysis zone (2) comprising a sample, of a light beam (4) having a spectral profile of light intensity within a wavelength working range,
said process further comprising, for each light-emitting diode (3):
a variation over time of the spectral profile of light intensity emitted by this diode (3) within the wavelength working range of this diode
receiving, by a detector (6) and during the variation over time of the spectral profile of light intensity emitted by this diode (3), the light beam (4) emitted by this diode (3) and having passed through the analysis zone (2),
supplying, by this detector (6), a detection signal (A') of the light beam (4) emitted by this diode and received by the detector (6), in the form of a signal which depends on at least one characteristic representative of the spectral profile of light intensity of this light-emitting diode (3)
further comprising, for each light-emitting diode (3):
supplying this light-emitting diode with electric current by imposing an electric supply current,
measuring a polarization voltage of this diode, and
determining, on the basis of the electric supply current imposed to this light-emitting diode and the measured polarization voltage of this diode, the at least one characteristic representative of the spectral profile of light intensity of this light-emitting diode.

* * * * *